US005471309A

United States Patent [19]

Bolza-Schünemann

[11] Patent Number: 5,471,309

[45] Date of Patent: Nov. 28, 1995

[54] PRINT QUALITY CONTROL DEVICE FOR PERFECTING PRESS

[75] Inventor: Ing H.-B. Bolza-Schünemann, Würburg, Germany

[73] Assignee: Koenig & Bauer Aktiengesellschaft, Wurzburg, Germany

[21] Appl. No.: 302,445

[22] Filed: Sep. 12, 1994

Related U.S. Application Data

[63] Continuation of Ser. No. 69,185, May 28, 1993, abandoned.

[30] Foreign Application Priority Data

May 30, 1992 [DE] Germany .......................... 42 17 942.4

[51] Int. Cl.[6] .......................... G01B 11/00; G01N 21/86

[52] U.S. Cl. .................... 356/394; 250/548; 250/559.45; 271/256; 271/266

[58] Field of Search .......................... 356/394, 73, 425, 356/237–239, 429–431, 445, 448, 71–72; 382/8, 34; 358/106, 107; 250/562, 563, 571, 572, 548, 559; 364/552, 525; 101/DIG. 45; 271/256, 266

[56] References Cited

U.S. PATENT DOCUMENTS

| | | | |
|---|---|---|---|
| 4,002,823 | 1/1977 | Van Osterhout | 356/240 |
| 4,488,808 | 12/1984 | Kato | 356/73 |
| 4,877,323 | 10/1989 | Stillwagon | 356/430 |
| 4,972,093 | 11/1990 | Cochran et al. | 356/394 |
| 5,018,213 | 5/1991 | Sikes | 356/429 |

FOREIGN PATENT DOCUMENTS

| | | |
|---|---|---|
| 380832 | 10/1984 | Austria . |
| 0194331 | 3/1985 | European Pat. Off. . |

*Primary Examiner*—Hoa Q. Pham
*Attorney, Agent, or Firm*—Jones, Tullar & Cooper

[57] ABSTRACT

A print quality control device for the analysis of the quality of printing on both sides of a sheet printed on a perfecting rotary printing press utilizes video cameras and flash sources on opposing sides of a sheet transport path. The cameras and flash sources are caused to operate to obtain an image of the forward and reverse sides of printed sheets. These images can be compared with set values to determine if the printed sheet's printed forward and reverse surfaces have acceptable printing quality.

4 Claims, 1 Drawing Sheet

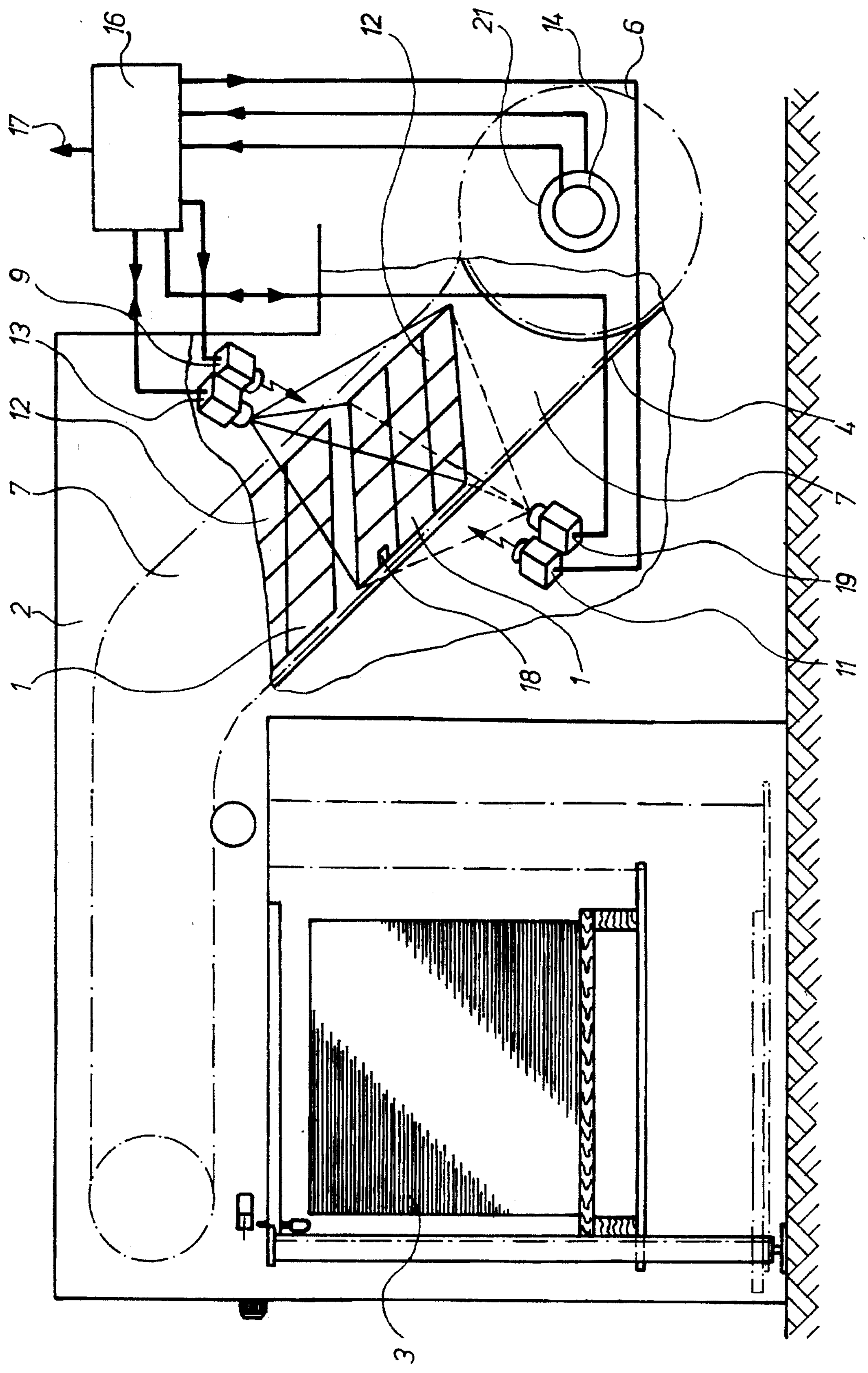
16
17
9
13
12
7
2
1
12
21
14
6
4
7
19
11
1
18
3

PRINT QUALITY CONTROL DEVICE FOR PERFECTING PRESS

This application is a continuation of application Ser. No. 08/069,185 filed May 28, 1993, now abandoned.

FIELD OF THE INVENTION

The present invention is directed generally to a print quality control device for a printing press. More particularly, the present invention is directed to a print quality control device for a perfecting rotary printing press. Most specifically, the present invention is directed to a print quality control device for printed sheets, preferably in a perfecting rotary printing press. The perfecting press may print on both sides of a sheet with the sheets being stacked in a single sheet stack so that only one side of the printed and stacked sheet is visibly inspectable. A straight sheet transport path is equipped with flash sources and video cameras which are coordinated to send images of an entire sheet's top and bottom surfaces to a micro-processor for comparison on a pixel by pixel basis to previously provided data for a good or acceptable printed sheet.

DESCRIPTION OF THE PRIOR ART

It is generally known that the print quality of rotary printing press produced sheets can be checked and controlled on line in one sided printing presses. European Patent Disclosure EP 01 94 331 A1 and U.S. Pat. No. 4,488,808 are two examples of on line print quality control devices for rotary printing presses. As indicated above, these prior art references describe quality control devices for one-sided printing assemblies.

In perfecting rotary printing presses there is a large danger of waste of the reverse printed side of the sheets of paper. Today there are a large number of reversing sheet-fed offset presses on the market which can either print in a normal multi-color manner on one side of a sheet (one-sided printing) or which can print on both sides of a sheet (two-sided printing). These reversing sheet-fed printing presses typically have only one large-stack sheet output. All of the sheets printed by the reversing press, whether printed on only one side or on both sides, are stacked in this sheet output stack device with only the printed front side up and visible. The printing press operator can thus only visually monitor the print quality and appearance of the printed front side of the sheets being printed during operation of the perfecting rotary printing press. The reverse sides of the sheet are not monitored, whether they have been printed or not. To overcome this problem, experienced press operators will periodically remove sample sheets from the sheet stacking device so that they can inspect both sides of the two sided printed sheet.

Various devices are known which allow both sides of printed sheets to be inspected. In reversing sheet-fed rotogravure printing presses the sheets that have been printed on both sides were stacked in an alternative way on two opposing, separate stacking tables in a way such that the sheets were stacked on one table with the printed front up and were stacked on another table with the printed reverse side of the sheets on top. These two separate stacks of sheets were continuously inspected for print quality by two separate control persons. Machines of this type have a relatively low operating speed and require the continuous presence of two qualified control people and the use of two separate sheet stacking devices. This clearly limits this procedure for controlling print quality.

In another generally known prior art construction, there is provided a device which operates with two large-stack delivery devices. The sheets are fed in opposite directions to these two devices. This allows the printing quality to be evaluated visually since one stack receives sheets with the printed front up and the other stack receives sheets with the printed reverse side of the sheets up. In this prior art device, a relatively high press output is possible but the presses became considerably longer and more expensive because of the two stack delivery devices.

It will be seen that a need exists for a print quality control device that overcomes the limitations of the prior art devices. The print quality control device for a perfecting rotary printing press in accordance with the present invention provides such a device and is a substantial improvement over the prior art devices.

SUMMARY OF THE INVENTION

It is an object of the present invention to provide a print quality control device for a perfecting press.

Another object of the present invention is to provide a print quality control device for a perfecting rotary printing press.

A further object of the present invention is to provide a print quality control device for printed sheets in a perfecting rotary printing press.

Yet another object of the present invention is to provide a print quality control device that checks the quality of both sides of a printed sheet at the same time.

Still a further object of the present invention is to provide a print quality control device which allows for the operation of the press with only one sheet delivery device.

As will be discussed in greater detail in the description of the preferred embodiment which is set forth subsequently, the print quality control device in accordance with the present invention is situated between a chain wheel for sheet transport chains and a sheet stack device to which the transported sheets move along a generally straight path. Video cameras and associated light flash sources are positioned both above the straight section of sheet travel as well as beneath or below the path of sheet travel. A suitable detector of a suitable marker or of printed lines on the sheet sends a signal to a microprocessor to actuate the video cameras and flash sources. The video cameras take a full exposure of the printed sheet and send the images to a microprocessor where the images are compared with a set of stored values. Two separate video cameras and flash sources are placed along the path of printed sheet travel, one above the printed sheet and one beneath the printed sheet. The images from both of the video cameras are compared with set values and the quality of the printed product is thereby ascertained.

The print quality control device in accordance with the present invention requires the use of only one printed sheet stacking device. Further, it utilizes video camera and flash placements which do not require substantial modification of the sheet delivery device. The video camera image of the printed sheet can be compared on a pixel by pixel basis with a set of values stored in the microprocessor. If the quality of the printed sheet deviates from the set values, the microprocessor can send a suitable signal to alert the press operator.

The print quality control device in accordance with the present invention overcomes the limitations of the prior art devices and is a substantial advance in the art.

BRIEF DESCRIPTION OF THE DRAWINGS

While the novel features of the print quality control device in accordance with the present invention will be set forth with specificity in the appended claims, a full and complete understanding of the invention may be had by referring to the detailed description of the preferred embodiment which is presented subsequently, and as illustrated in the sole drawing figure which is a schematic depiction of a print quality control device for a perfecting rotary printing press in accordance with the present invention.

DESCRIPTION OF THE PREFERRED EMBODIMENT

Referring to the sole sheet of drawings, there is shown a print quality control device for a perfecting rotary printing press in accordance with the present invention. In such perfecting sheet-fed rotary printing presses, which are generally known in the art, sheets of paper, generally at 1, are printed in a known manner by means of the perfecting method so that they are printed on both sides. These sheets 1, which carry printing on both front and rear or reverse sides, are transferred from the last printing unit, which is not specifically shown in the drawings, to a sheet delivery device, generally at 2, which is generally known. The sheet delivery device 2 receives the sheets 1 printed on both sides, and takes up the sheets using controlled rows of sheet grippers (not shown). The rows of grippers are typically installed on gripper carriages (also not shown) which are attached to two endless gripper chains 4. These gripper chains 4 extend in endless loops around chain wheels 6 at the press end of the sheet delivery device 2 and which are driven by the main drive of the press. These endless gripper chains also pass around chain wheels which are located generally above a sheet stacking device 3. Both gripper chains 4 are driven at the same speed by the main drive of the press to insure a synchronous drive of the drive chains 4.

Sheet delivery devices 2 generally have an inclining yet generally straight sheet transport path 7. This sheet transport path 7 originates at the chain wheels 6 adjacent the last printing Unit and rises upwardly in a straight path until it levels to a horizontal path over the sheet stacking device 3. In accordance with the present invention, a flash source 9 and an associated video cameral 13 are placed along this upward path above the sheets 1. A similar flash source 11 and a similar video camera 19 are placed beneath the printed sheets 1 along the sheet transport path 7. The upper flash source 9 is provided in a gap or space between the forward traveling and the return traveling sides or paths of the sheet gripper chains 4. The video camera 13 is positioned in a location generally adjacent to flash source 9 but the flash source is located outside of the cone of focus of the upper video camera 13 on the printed upper surfaces 12 of the sheets 1. This insures that the upper flash source 9 will not interfere with the image or "exposure" of the front surface 12 of the printed sheet 1. The video camera 13 is disposed at an appropriate distance from the upper surface 12 of the printed sheet 1. The video camera 13 is in the form of a system fixed in place and is equipped with a CCD surface scanner. The beam of the upper video camera 13 impacts on the upper surface 12 of the sheet 1 at a right angle. The distance of the upper video camera 13 from the sheet 1 and its focus are selected so that the entire surface of a sheet of maximum size will be covered by one "exposure" of the camera. The flash source 9 and the video camera 13 for the upper surface 12 of the sheet are synchronized.

An encoder 14 is secured to the Shaft end of the chain wheel 6 at the infeed end of the sheet delivery device 2. This encoder 14 determines the number of shaft revolutions and arms a photoelectric trigger device, which can be in the form of an optical-electronic device. This trigger device may recognize a marker on the edge of a sheet being printed. It may recognize an edge of the sheet itself, or it may recognize a start of the actual printing on a sheet whose printing quality is to be determined. When the photo-electric trigger has been armed by the encoder 14, it will be in its so-called "window phase" and will forward a signal to a microprocessor unit 16 when it recognizes a marker or a sheet edge or the start of printing on a sheet. The signal generated by the photo-electric trigger is sent to a microprocessor unit 16 which triggers a command signal to the flash source 9 and concurrently to the upper video camera 13. A single picture is taken by the upper video camera 13 and is illuminated by the coordinated upper flash unit 9. This single picture is digitally stored in the memory of the microprocessor unit 16 and is compared on a pixel by pixel basis with set values which are also stored in the microprocessor 16.

In the microprocessor, the image from the upper video camera 13 is compared with a set of values which have previously been entered into the microprocessor. If the values from the image supplied to the microprocessor 16 from the upper video camera 13 deviate by more than a permissible amount from the standard set of values, control pulses 17 will be sent by the microprocessor 16 to the electrical control center for the printing press. These control pulses 17 can be used to make the press operator aware that defective sheets are being printed, can be used to adjust the printing press to rectify the printing error, can be used to activate a marking unit to mark the defective sheets, or can be used to activate a generally known sheet ejection device. In any case, the comparison conducted by the microprocessor, or other comparison means, in a generally well-known, conventional manner will give rise to a signal or other appropriate action in the case of a defectively printed sheet.

A similar lower flash source 11 and a lower video camera 19 are placed at a distance beneath the movement path of the printed sheet 1. This lower flash source 11 and video camera 19 are generally similar in position and operation to the upper flash source 9 and upper video camera 13 discussed previously. The lower video camera 19 is provided with an optical system and a CCD surface sensor. As the printed sheet 1 moves along the sheet transport path 7 of the sheet delivery device 2, a second encoder 21 on the shaft end of the chain wheel 6 will arm a second trigger device. The reverse or lower printed surface of the printed sheet 1 will actuate the second trigger device which will, in turn cause the microprocessor to actuate the lower flash source 11 and the lower video camera 19 to take a single "exposure" of the entire printed sheet 1. This image is then compared by the microprocessor 16 or other comparison means in the same fashion as discussed above and a similar arrangement of control pulses 17 or other control signals can be generated in the case where the deviance of the sample values exceed the set values by more than a permissible amount. As discussed above, the encoder 21 which is associated with lower video camera 219 is the same as the encoder 14 which is associated with upper video camera 13. Both of the encoders 14 and 21 are connected by suitable circuits to the microprocessor 16 as is depicted schematically in the sole drawing figure. The control, checking, and error evaluation function performed by the microprocessor are the same for the upper and lower video cameras 13 and 19 for the two-sided printing system shown in the drawing.

Since the two video cameras 13 and 19 in accordance with the present invention, which are provided with CCD surface sensors, are positioned on opposite sides of the sheet ascending sheet travel path 7 of the sheet delivery system 2, it is possible to check the printing quality of both the front as well as the reverse surfaces of the sheets before the printed sheets are deposited on the sheet stacking device 3.

The light sources 9 and 11 are provided as flash devices because of the moving gripper carriages with gripper rows. The upper and lower video cameras 13 and 19 are connected in such a way that they take a whole picture when no gripper carriage is passing through the image. The cooperation of the encoders 14 and 21 with the trigger devices insures that the video cameras 13 and 19 will only be actuated in conjunction with the flash sources 9 and 11 at the appropriate time when the moving gripper carriages are not in the area of the image seen by the video cameras. The optical-electronic device which recognizes a marker 18 on the printed sheet or an edge of the sheet or a first line of printing or the like, may be integrated into the video camera housing and into its electronic circuitry.

Sheet guide rods could be used for the exact guidelines of the printed sheets 1. These sheet guide rods are in contact with print free parts of the printed sheets and these print-free parts can glide along the sheet guide rods. It is also possible to utilize suction rings that are provided with suction air and which engage the unprinted parts of the sheets being transported. The running speed of the suction rings is just slightly less than the sheet speed. This allows the sheets to be kept taut between the rows of grippers and the suction rings during the time that the video cameras are operational.

As discussed above, the microprocessor can be provided with set values which are utilized in a generally well known way to compare the values of the printed sheet received by the microprocessor 16 from the video cameras 13 and 19 with the set values. If desired, one or more sheets which a checker has found to be good can be removed from the sheet stack 3, or from some other area of the press, and can be passed through the print quality control device where they are scanned by the video cameras 13 and 19. In this mode of operation, the microprocessor is placed in a planning or receiving mode so that the values received from the good printed sheets will be entered into the microprocessor as the stored values against which subsequent printed sheets will be evaluated. These values for the good print pattern from the sheets run through the print quality control device will be entered into the microprocessor on a pixel by pixel basis.

While a preferred embodiment of a print quality control device for a perfecting rotary printing press in accordance with the present invention has been set forth fully and completely hereinabove, it will be apparent to one of skill in the art that a number of changes in, for example, the length of the sheet transport path, the size of the sheet stacking device, the type of sheet grippers and the like may be made without departing from the true spirit and scope of the present invention which is accordingly to be limited only by the following claims.

What is claimed is:

1. A print quality control device for controlling the quality of sheets printed on both sides in a perfecting rotary printing press, said print quality control device comprising;

a sheet delivery device having spaced sheet transport gripper chains driven by shaft supported chain wheels and being usable to receive printed sheets from a perfecting printing press and to transport said sheets to a sheet stacking device;

a sheet transport path in said sheet delivery device;

first and second encoder means being usable to determine the number of shaft revolutions of said shaft supported chain wheels;

an upper flash source and an upper video camera positioned in said sheet delivery device above said sheet transport path;

a lower flash source and a lower video camera positioned in said sheet delivery device below said transport path;

an upper trigger device positioned in said sheet delivery device above said sheet transport path and being selectively armed in response to said first encoder means, and a lower trigger device positioned in said sheet delivery device below said sheet transport path and being selectively armed in response to said second encoder means, each of said upper and lower trigger devices being selectively operable after being armed in response to its associated encoder means to recognize a printed sheet on said sheet delivery device;

a microprocessor for receiving signals from said first and second encoder means and for selectively arming each of said upper and lower trigger devices in response to said received signals from said first and second encoder means for selectively recognizing a printed sheet on said sheet delivery device and for selectively activating each of said upper and lower flash sources and video cameras when a selected printed sheet whose print quality to be controlled is sensed by said selectively armed trigger devices and is positioned in said sheet transport path between said upper and lower flash sources and video cameras in an unobstructed viewing position to provide an unobstructed image of each of said upper and lower printed sides of said selected one of said printed sheets; and means in said microprocessor for comparison of said images with a standard.

2. The print quality control device of claim 1 wherein said sheet transport path is a straight line.

3. The print quality control device of claim 1 wherein said upper and lower video cameras are positioned generally along a centerline of said sheet transport path and are operable to obtain an unobstructed image of an entire printed sheet.

4. The print quality control device of claim 1 wherein said standard is provided to said microprocessor by an image provided by said upper and lower video cameras from a printed sheet whose quality has been visually established as good.

* * * * *

UNITED STATES PATENT AND TRADEMARK OFFICE

CERTIFICATE OF CORRECTION

PATENT NO. : 5,471,309

DATED : November 28, 1995

INVENTOR(S) : BOLZA-SCHUNEMANN, Hans-Bernhard

It is certified that error appears in the above-indentified patent and that said Letters Patent is hereby corrected as shown below:

Column 6, claim 1, line 11, after "means" insert --in said sheet delivery device, said first and second encoder means--.

Signed and Sealed this

Twenty-third Day of April, 1996

Attest:

BRUCE LEHMAN

*Attesting Officer*

*Commissioner of Patents and Trademarks*